June 23, 1959 — C. A. ELLIS — 2,891,312
COMBINED BEARING AND TURBINE ELEMENT
Filed Jan. 9, 1958
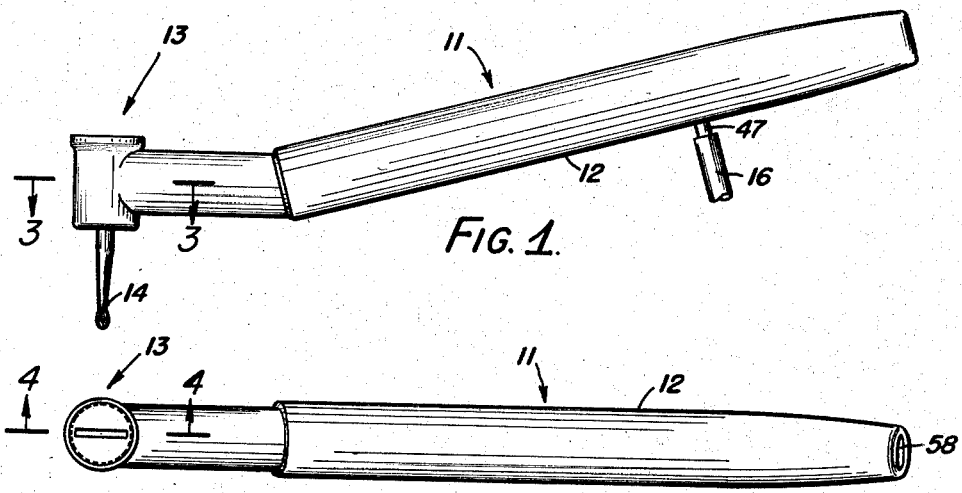
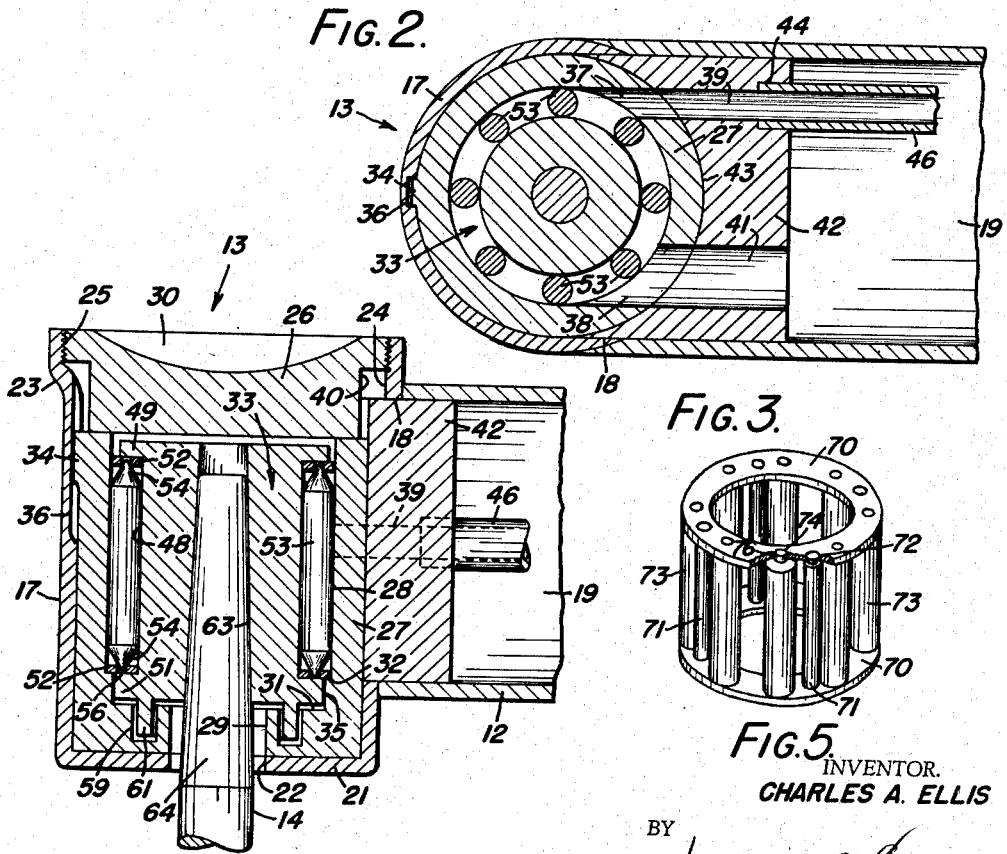
INVENTOR.
CHARLES A. ELLIS
BY
ATTORNEY United States Patent Office 2,891,312
Patented June 23, 1959

2,891,312
COMBINED BEARING AND TURBINE ELEMENT

Charles A. Ellis, Rochester, N.Y., assignor to Ritter Company, Inc., Rochester, N.Y., a corporation of Delaware Application January 9, 1958, Serial No. 707,989

7 Claims. (Cl. 32—27)

This invention relates to dental apparatus and more particularly to a relatively new commercial type of dental handpiece having a drive mechanism including a turbine driven by a pressurized fluid, such as compressed air, and which is employed by dentists to perform such operations as the drilling, polishing, grinding of patients' teeth and the like.

In the practice of dentistry, the dental handpiece has always been an invaluable instrument, and many constructions have been proposed for the mechanism carried in the handpiece for driving a dental tool, such as a drill or burr. This invention is particularly concerned with handpieces having driving mechanisms which are actuated by a pressurized fluid such as compressed air, and which are commonly known as "fluid turbine" type of dental handpiece. In this type of handpiece the compressed air is directed against a rotatably mounted turbine to which the dental tool is drivably connected.

The "fluid turbine" drive mechanism is inherently of complex construction and requires workmanship and machining of the highest order to produce properly fitting and cooperating parts. For instance, a miniature turbine rotor, having a plurality of vanes is one of the many precision parts required in such a drive mechanism. The need for a high degree of accuracy in the fabrication of these parts and the multitude of parts generally required consequently adds considerably to the manufacturing cost. Furthermore, even when the tolerances on the various parts are held to a minimum, it is often difficult to get a fit which permits the parts to be easily and quickly assembled and disassembled.

Another problem confronted in such turbine driven handpieces is the frequent mechanical breakdown which occurs in the delicate, complex driving mechanism. The turbine may be driven at speeds in excess of 100,000 r.p.m., imposing a severe strain on not only the turbine itself but the supporting parts associated with the turbine. The maintenance cost for such handpieces has heretofore been relatively high, and the use of handpieces is frequently interrupted, imposing a considerable inconvenience on the dentist.

Accordingly, a primary object of this invention is to provide a novel drive mechanism for a dental handpiece of the fluid turbine type, which avoids or minimizes the above-mentioned disadvantage.

Another object of this invention is to provide a novel construction for a dental handpiece of the fluid turbine type which is composed of parts arranged and constructed in a novel manner, so as to permit an element of the fluid turbine to function as a means for supporting the turbine.

This invention further contemplates the provision of a novel construction for the drive mechanism of a dental handpiece of the fluid turbine type in which the turbine rotor, to which a dental tool may be secured in an easily replaceable manner, is supported in the handpiece in an easily removable manner on bearing elements which not only rotatably support the turbine rotor, but which also fulfill the function of turbine vanes against which the stream of pressurized driving fluid is directed.

A further object of this invention is to provide a novel driving mechanism for a dental handpiece of the fluid turbine type which is simple in construction, has a fewer number of parts, is inexpensive to manufacture, and which is relatively simple to assemble and disassemble, and in which the danger of breakdown is greatly minimized.

Other objects and advantages of this invention will be particularly set forth in the claims and will be apparent from the following description, when taken in connection with the accompanying drawings, in which:

Fig. 1 is a side elevational view of a dental handpiece of the fluid turbine type incorporating the invention;

Fig. 2 is a top plan view of the dental handpiece of Fig. 1;

Fig. 3 is an enlarged, fragmentary sectional view taken substantially along line 3—3 of Fig. 1 in the direction of the arrows;

Fig. 4 is an enlarged, fragmentary sectional view taken substantially along line 4—4 of Fig. 2 in the direction of the arrows; and Fig. 5 is a view of a modified form of the invention.

As generally illustrative of the invention, there is shown in Fig. 1 a dental handpiece designated generally by the numeral 11 and having a body or casing 12. A head, designated generally by the numeral 13, and preferably of cylindrical shape as shown, is suitably secured to the forward end of casing 12 in any appropriate manner. The head 13 is arranged to contain a rotatable dental tool 14, such as a drill or burr in a manner to be hereinafter explained with the tool connected to a driving mechanism constructed in accordance with this invention.

The dental handpiece 11 is of the type which is generally known as the "fluid turbine" type of handpiece and is arranged to be driven by pressurized fluid such as compressed air which is fed to the dental handpiece by means of a pressure hose or line 16 connected in any convenient manner to the handpiece as shown in Fig. 1.

As is well known, the fluid turbine type of handpiece employs a rotatably supported turbine rotor which is driven by means of compressed air so that a dental tool connected in any conventional manner to the rotor may be rotated thereby at a relatively high speed. Through the novel construction of this invention, the means for supporting the turbine rotor also functions as an element of the turbine rotor.

As specifically illustrative of this invention, and as shown best in Figs. 3 and 4, the dental handpiece head 13 comprises a generally cylindrical housing 17 which is fixed in any suitable manner such as by brazing, welding or the like to the forward end of the handpiece casing 12. The housing 17 is provided with a lateral opening 18 which is aligned with the inner bore 19 of the casing 12 when the head 13 is connected to the casing.

Housing 17 also contains an inwardly directed marginal flange 21 at its lower end defining an opening 22, and is enlarged at its upper end at 23 to provide a top opening 24. The inner wall of housing 17 adjacent its upper end is preferably threaded, as shown at 25, to accommodate a flanged cap or plug 26 which may be slotted, if desired, as shown at 30 to facilitate assembly, and which is externally threaded so as to cooperate with threads 25.

In order to position the driving mechanism for the dental handpiece in the head 13, an inner liner or shell 27 is provided. Shell 27 is preferably cylindrical in shape so as to fit snugly within housing 17, as shown in Fig. 4. The lower portion of shell 27 is in engagement with flange 21. Cap 26 forces shell 27 against flange 21, thereby securely retaining the shell in the position shown in Fig. 4.

Shell 27 contains a central bore 28 having a portion of reduced diameter 29 so as to provide an inwardly projecting flange or ledge 31. The central bore 28 also contains a second portion of reduced diameter 35 so as to provide a second ledge or shoulder 32. A turbine rotor, designated generally by the numeral 33, is located within the shell bore 28 in a manner to be hereinafter explained.

Shell 27 is preferably positioned and aligned in housing 17 by a projection or bead 34 on the shell engaging a cooperating slot or keyway 36 (Figs. 3, 4) in housing 17. Accurate positioning of the shell is necessary, as the shell 27 is provided with laterally extending air inlet and outlet passages 37 and 38 as shown in Fig. 3, which communicate with passages 39 and 41, respectively, in a sealing member or plug 42 positioned within the bore 19 of handpiece casing 12. Plug 42 is positioned within the forward end of the handpiece casing 12 and contains a forward arcuate face 43 which is arranged to engage the outer wall of the shell 27 in flush relationship when the shell is inserted in the housing 17. As can be seen in Fig. 4, cap 26 is cut away at 40 so as to provide a clearance for the plug 42. It will be noted that outlet passages 38 and 41 are preferably of substantially larger diameter than the inlet passages 37 and 39, as shown in Fig. 3, to accommodate the larger volume of the expanded air leaving the turbine. Furthermore, the plug 42 is recessed at 44 to receive one end of a tubular member of inlet air conduit 46. The other end of the conduit 46 may be connected in any suitable manner such as a fitting 47 (Fig. 1) to the pressure line 16.

As further illustrative of the invention, means have been provided in the turbine rotor 33 to detachably support the dental tool 14 and combined supporting and driving means have been provided for the turbine rotor 33.

More specifically, in order to rotatably support the rotor 33 in the shell bore 28, the rotor is cut away to provide a peripheral recess 48 having marginal ends terminating adjacent each end of the rotor to form a pair of shoulders or flanges 49 and 51. An annular member 52, such as a split washer or ring, is suitably positioned as shown in Fig. 4 in abutting engagement with each of the shoulders 49 and 51, within the peripheral recess 48. The edge of the lower ring 52 overlies shoulder 32 and thus supports rotor 33 in spaced relationship with shell flange 31.

Turbine rotor 33 is preferably supported by a plurality of needle bearings 53, radially spaced within the rotor recess 48, with their axes extending in a direction substantially parallel to the axis of the rotor. In order to support the bearings on the rotor, the bearings are tapered at each end at 54 and these ends are received within suitably spaced perforations 56 in each of the rings 52. The spacing of the rings 52 is such that only limited axial movement of the bearings is permitted. Furthermore, the rings 52 are preferably of such diameter as to provide a clearance between their outer edges and the shell bore 28. Thus, rotor 33 is rotatably supported within the shell bore 28 by needle bearings 53, while shoulder 32 retains the rotor in the proper vertical position.

The fluid turbine type of dental handpiece described above is arranged to be driven by pressurized fluid such as water but preferably compressed air which is fed to the turbine rotor 33 serially through pressure hose 16, conduit 46 and inlet passageways 39 and 37, so that the air is directed tangentially against supporting needle bearings 53 as shown in Figs. 3 and 4.

In previous constructions, the turbine rotor for such handpieces was provided with a plurality of circumferentially spaced integral vanes against which the compressed air stream was directed for driving the rotor. However, in the present invention, the needle bearings 53 not only rotatably support the rotor 33 but in addition serve as vanes for the rotor, so that the compressed air may be directed against the needle bearings to drive the rotor at the relatively high speeds common to the fluid turbine type of driving mechanism.

The air discharged from the turbine rotor 33 is exhausted through exhaust passages 38, 41 into the casing bore 19, and thence to the atmosphere through a suitable casing outlet opening 58 (Fig. 2).

It can be seen that some leakage of air will occur around the lower edge of the rotor 33 and through opening 22 which in the illustrated embodiment is desirable for cooling tool 14. In order, however, to prevent the escape of substantial quantities of air, a seal is provided. This seal is preferably of the labyrinth type, comprising an annular groove 59 in the shell flange 31 which accommodates a downwardly projecting annular sleeve 61 in spaced relationship as shown in Fig. 4. Movement of air through this labyrinth seal formed by groove 59 and sleeve 61 is thus greatly restricted.

As previously explained, the turbine rotor 33 is provided with means for releasably holding a dental tool 14 and, in the illustrated embodiment, the tool holding means comprise a centrally located tapered bore 63 in rotor 33 which receives the tapered shank 64 of dental tool 14. Therefore, when the handpiece is to be operated, a dental tool 14 is secured to turbine rotor 33 by inserting the tool shank 64 forcibly within tapered rotor bore 63 so that it is securely held by frictional engagement in the well known manner as shown in Fig. 4. It can be seen that in the mounted position, the tool shank 64 extends through the shell opening 29 and the housing opening 22. Removal of the tool 14 from the rotor 33 may be accomplished by removing the cap 26 and dislodging the tool shank from the rear. It should be understood that any type of dental tool holding mechanism may be employed and the tapered bore arrangement is shown for illustrative purposes only, forming no part of the present invention.

As a result of the novel construction described above, the turbine rotor 33 therefore may be inexpensively manufactured and easily assembled within the dental head 13. The elimination of the rotor vanes and the utilization of the bearing elements as a replacement for the vanes substantially reduces the number of parts employed in the fluid turbine type of driving mechanism. The drive mechanism is capable of operating for more extended periods without danger of breakdown, and wear is held to a minimum.

It will be further noted that the dental handpiece driving mechanism of the invention may be easily placed as a unit within the head 13, thereby facilitating repair and replacement of the working parts.

In Fig. 5 I have shown a modified but perhaps preferred form of the invention in which a cage or support structure is provided for the combined needle bearings and vanes 73. This cage comprises a pair of annular plates 70 spaced from each other by approximately the length of the bearings. The annular plates 70 are rigidly connected together and spaced accurately by, posts 71 headed over in plates 70 as shown at 72. The needle bearings are provided with reduced ends 74 which extend through apertures 76 formed in the annular plates 70. By this means the needle bearings are rigidly held against shifting out of parallelism with the axis about which they rotate.

While there has been shown and described the preferred forms of mechanism of the invention, it will be apparent that various changes and modifications may be made therein, particularly in the form and relation of parts, without departing from the spirit of the invention as set forth in the appended claims.

I claim:

1. A dental handpiece of the type adapted to be driven by pressurized fluid, said handpiece comprising in combination, a casing, rotor means in said casing, and means for rotatably supporting said rotor in said casing, and means for directing a stream of pressurized fluid against said supporting means for causing said rotor to rotate.

2. A dental handpiece of the type adapted to be driven by pressurized fluid, said handpiece comprising, in combination, a casing, rotor means in said casing, bearing elements interposed between said rotor means and the inner wall of said casing for rotatably supporting said rotor means therein, and means for directing a stream of pressurized fluid against said bearing elements for causing said rotor to rotate.

3. A dental handpiece of the type adapted to be driven by pressurized fluid, said handpiece comprising a casing, having a substantially cylindrical chamber, rotor means in said chamber, bearing elements interposed between said rotor means and the inner wall of said chamber for rotatably supporting said rotor means therein, said casing having an opening extending through the wall thereof in a direction substantially tangential to said cylindrical chamber and communicating therewith for directing a stream of pressurized fluid against said bearing elements for causing said rotor to rotate.

4. A dental handpiece of the type adapted to be driven by pressurized fluid, said handpiece comprising, in combination, a casing, substantially cylindrical rotor means in said casing, circumferentially spaced needle bearing elements interposed between said rotor means and said inner wall of said casing for rotatably supporting said rotor means therein and means for directing a stream of pressurized fluid against said bearing elements for causing said rotor to rotate.

5. A dental handpiece of the type adapted to be driven by pressurized fluid, said handpiece comprising, in combination, a casing, rotor means in said casing, bearing elements interposed between said rotor means and the inner wall of said casing for rotatably supporting said rotor means therein, abutment means in said casing for engaging said rotor and preventing axial movement thereof, and means for directing a stream of pressurized fluid against said bearing elements for causing said rotor to rotate.

6. A dental handpiece of the type adapted to be driven by pressurized fluid, said handpiece comprising, in combination, a casing, rotor means in said casing, bearing elements interposed between said rotor means and the inner wall of said casing for rotatably supporting said rotor means therein, means on said rotor means for engaging a dental tool, a dental tool having a shank, an opening in said casing for accommodating the shank of said dental tool attached to said rotor by said engagement means, mating sealing means on said rotor and on said casing for limiting the escape of air through said opening and around the shank of said tool and means for directing a stream of pressurized fluid against said bearing elements for causing said rotor to rotate.

7. A dental handpiece of the type adapted to be driven from an associated source of pressurized fluid comprising, in combination, a casing, a head at one end of said casing, a turbine rotor having a central bore, an opening in said head for accommodating the shank of a dental tool inserted within said rotor central bore, conduit means for conducting said pressurized fluid to said turbine rotor, a substantially cylindrical shell having a bore arranged to be positioned in said head, a removable cap on said head for retaining said shell within said head, means for supporting said turbine rotor within the bore of said shell including a plurality of circumferentially spaced needle bearings rotatably mounted on said rotor and extending axially therewith, said bearings being of such diameter as to rollingly engage the bore of said shell and said conduit means being arranged to direct said pressurized fluid against said needle bearings so as to rotate said rotor and said dental tool within said head.

References Cited in the file of this patent

UNITED STATES PATENTS 2,180,993    Monnier _____ Nov. 21, 1939